Jan. 12, 1971 R. D. STAMM 3,554,041
PUSHBUTTON TUNER
Filed Feb. 14, 1966 2 Sheets-Sheet 1

INVENTOR.
RUSSELL D. STAMM
BY
James and Franklin
ATTORNEYS

INVENTOR.
RUSSELL D. STAMM

BY

James and Franklin

ATTORNEYS 3,554,041
Patented Jan. 12, 1971

3,554,041

PUSHBUTTON TUNER

Russell D. Stamm, Wilbraham, Mass., assignor to General Instrument Corporation, Newark, N.J., a corporation of New Jersey Filed Feb. 14, 1966, Ser. No. 527,318
Int. Cl. F16h *35/18*
U.S. Cl. 74—10.33 10 Claims

ABSTRACT OF THE DISCLOSURE

The pushbutton tuner has the usual rocker which is tilted by one or another key having independently adjustable means for bearing against and positioning the rocker for tuning. However, in this tuner each button assembly operates one or another of two collateral keys, the button assembly including a shuttle which is movable to one position to move one key, and to another position to move the other key. Each button assembly has a button shell with two superposed half buttons, and when one half button is pressed, the button assembly moves one key, whereas when the other half button is pressed, the button assembly moves the other key. For this purpose a shuttle lever has arms engaged by the half buttons to shift the shuttle at the beginning of the main button movement. One shuttle position may be used for AM tuning and the other for FM tuning, in which case there is an electrical switch for changeover from AM to FM or vice versa, and a switch plate is engaged by the keys for automatically operating the said switch in appropriate direction for AM or FM.

This invention relates to pushbutton tuners and more particularly to a dual tuner which may be used to independently tune two different units, for example an AM and FM radio receiver.

Pushbutton tuners are well-known and are particularly valuable for some purposes, for example automobile radios, because the operator does not have to take his eyes from the road when tuning the receiver. More recently there has been a trend toward the provision of FM as well as AM reception, and tuners have been made in which some buttons in a row of buttons are used for AM tuning and others for FM tuning.

The general object of the present invention is to improve such dual purpose pushbutton tuners. A more particular object is to provide such a tuner in which all of the buttons may be used for AM tuning or for FM tuning at the option of the user. Thus with a row of five main buttons, five AM or five FM stations may be tuned, that is ten stations in all. In a smaller tuner here illustrated there are three main buttons, for tuning six stations in all.

For this purpose each button is really a button assembly which includes shuttle mechanism to move either of two keys, each with independent tuning adjustment. The button assembly comprises a button shell which carries two half buttons, preferably top and bottom half buttons. If the operator presses the button assembly at the top half button he tunes one unit, say the AM receiver, and if he presses the button assembly at the bottom half button, he tunes the other unit, say the FM receiver. These are independently tunable, much as though using two individual pushbuttons. However, the buttons are large and easily located and easily manipulated.

A further object is to provide the tuner with means to move an electrical changeover switch to appropriate position, depending on whether a button assembly is pushed at the upper or lower half button. Further objects are to provide the tuner with refinements and improvements already devised for single purpose tuners such as those disclosed in my earlier Pat. 2,996,925, issued Aug. 22, 1961 and entitled Push Button Tuner. For example, the manual tuning means with its reduction gearing is declutched when using a bushbutton. The tuning adjustment of a pushbutton may be changed by simply pulling the button outward to release a winged cam carried by the key of that button, and after manually tuning to the desired station the winged cam is again locked by simply pushing in the button. This simple operation is here retained, one cam only being released and again locked, depending on whether the upper or the lower half button is utilized when manipulating the button assembly.

To accomplish the foregoing general objects, and other more specific objects which will hereinafter appear, my invention resides in the pushbutton tuner elements and their relation one to another as are hereinafter more particularly described in the following specification. The specification is accompanied by drawings in which.

Figure 1:
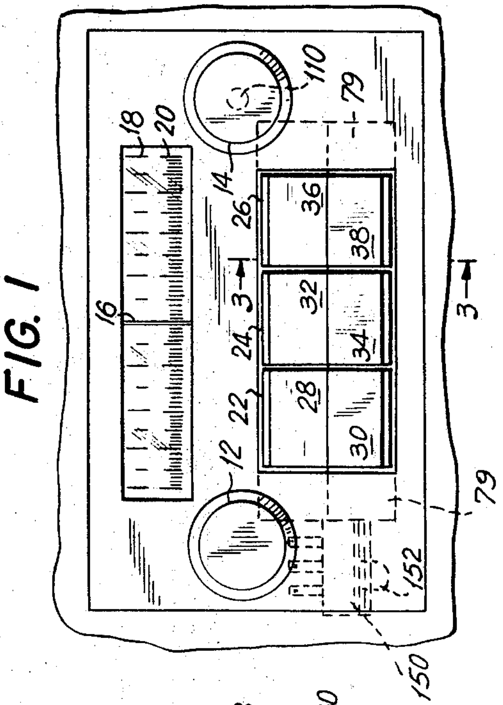
FIG. 1 is a front elevation of an automobile radio receiver embodying features of the invention.
Figure 2:
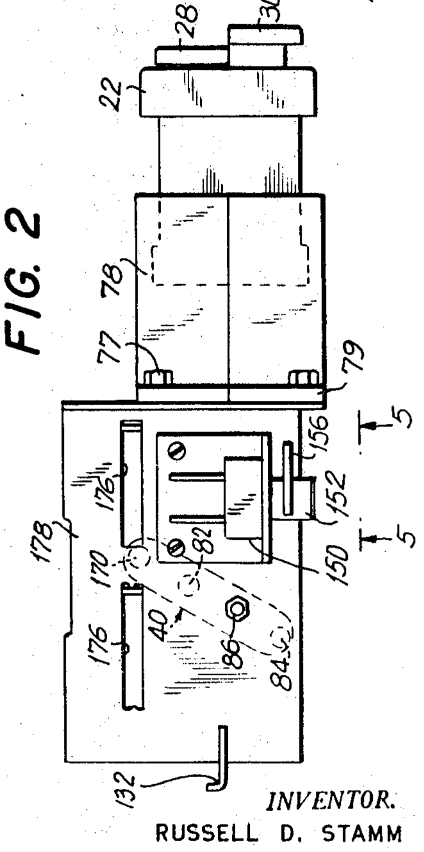
FIG. 2 is a side elevation of the tuner, looking toward the left of FIG. 1 but omitting the volume control.

Referring to the drawing and more particularly to FIGS. 1 and 2, the radio receiver has the usual On-Off knob 12, which acts also as a volume control. There is a tuning knob 14 for manual tuning, this being shown by movement of an indicator 16 along horizontal scales 18 and 20, one scale being numbered for AM tuning and the other for FM tuning.

There is also a row of pushbutton assemblies, in the present case three such assemblies 22, 24 and 26. Each is a hollow rectangular shell carrying two half buttons, one above the other. In the present case button assembly 22 includes half buttons 28 and 30; button assembly 24 includes half buttons 32 and 34, and button assembly 26 includes half buttons 36 and 38. Each half button is movable for a short distance, say one-eighth inch relative to the button shell, and the latter then is movable for a substantial distance, say one-half inch, for tuning purposes. In the present case it is assumed that the upper half buttons serve for AM tuning and the lower half buttons for FM tuning, but the opposite arrangement may be employed.

In FIG. 2 the upper half button 28 was last employed, that is, the button assembly was pushed by bearing against the upper half button. This puts the lower half button in its outer position as shown in FIG. 2, and it remains in that position when the button shell 22 moves back to the outer position shown. If the FM station of the same button is next wanted, the button assembly is pushed by bearing against the lower half button.

Figure 3:
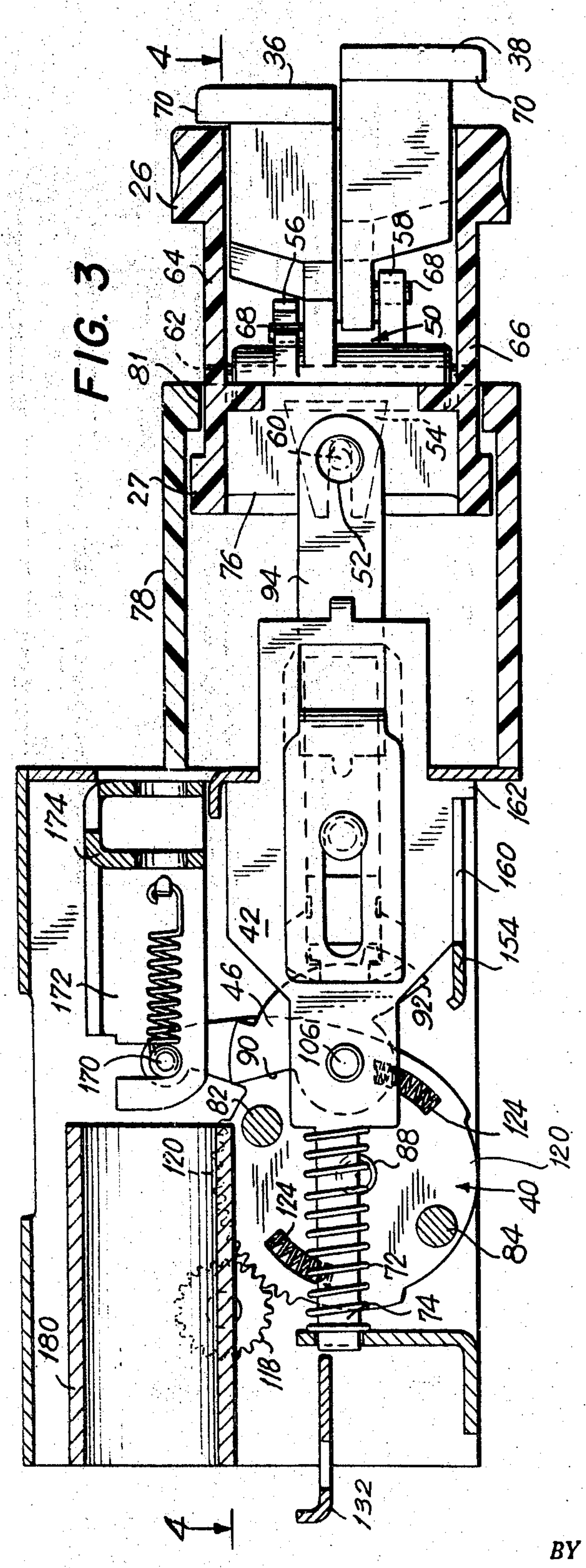
FIG. 3 is a vertical section taken approximately on the line 3—3 of FIG. 1.
Figures 4, 5, 6:
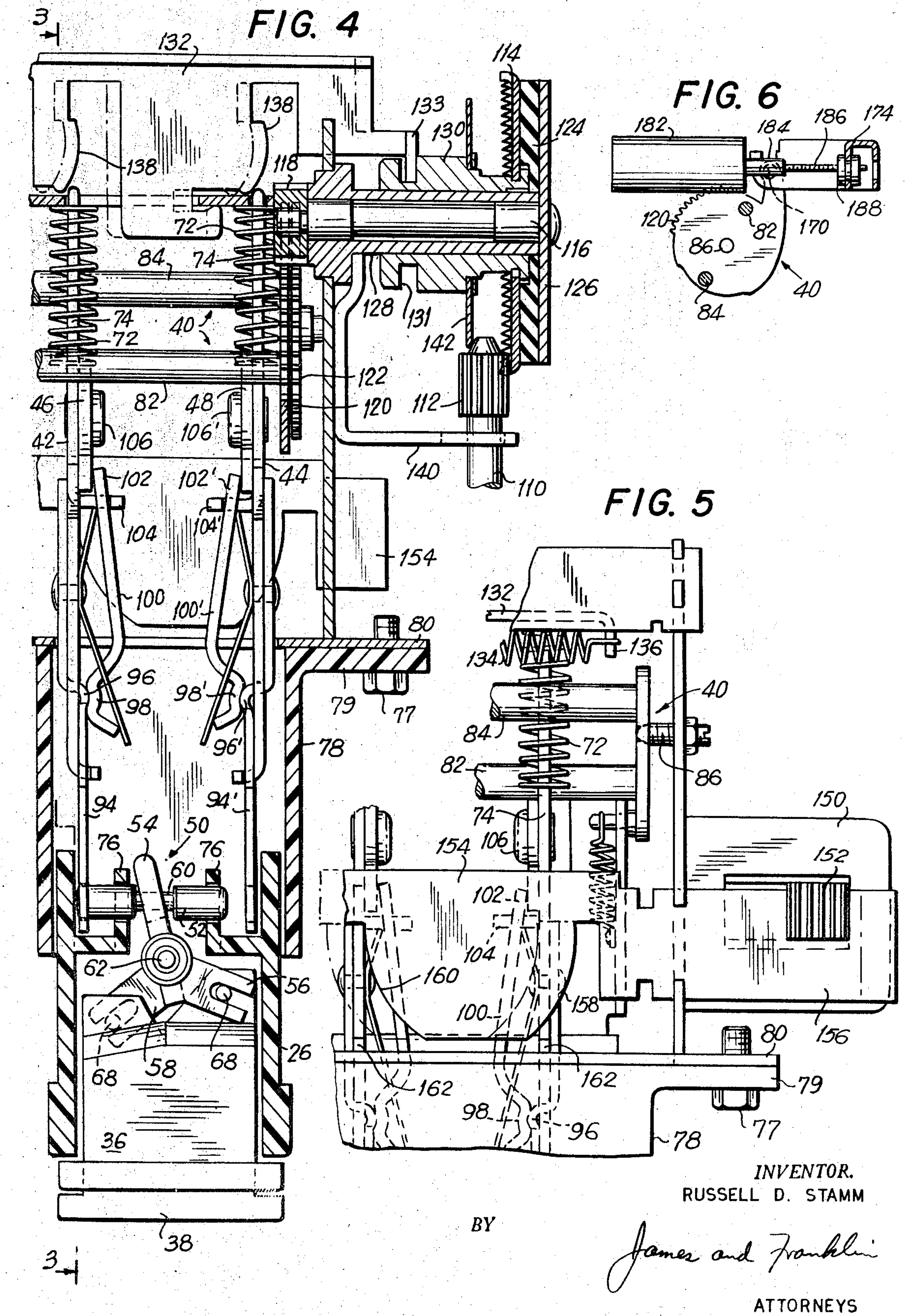
FIG. 4 is a fragmentary horizontal section taken approximately on the line 4—4 of FIG. 3.
FIG. 5 is a fragmentary bottom view taken at the line 5—5 in FIG. 2.
FIG. 6 is a fragmentary schematic vertical view showing how a slidable carriage is connected to the tuning cores of the tuning coils.

Referring now to FIGS. 3 and 4 of the drawing, there is a main rocker generally designated 40. The button assembly shown comprises the button shell 26 with its upper and lower half buttons 36 and 38. There are two collateral keys 42 and 44 for the button assembly 26. Key 42 has a means 46, and key 44 has an equivalent means 48, for bearing against and positioning the rocker 40 for tuning purposes. The means 46 and 48 are independently adjustable, so that the AM tuning is independent of the FM tuning. The button assembly further carries shuttle mechanism generally designated 50 whereby when one half button is pressed, in this case the half button 36, the button assembly moves one key, in this case the key 42, whereas when the other half button 38 is pressed the button assembly moves the other key 44.

The mechanism 50 comprises a shuttle pin 52 which is disposed transversely of the button assembly and which is movable axially between two end positions. When moved to the left as shown in FIG. 4 it engages or is in the path of the key 42, and is disengaged from the key 44, whereas if moved to its other end position, that is toward the right as viewed in FIG. 4, it would engage the key 44 and be disengaged from the key 42.

The mechanism further comprises a shuttle lever having arms 56 and 58 engaged by the half buttons 36 and 38 respectively, and so connected to the shuttle pin 52, as by means of a third arm 54, that when half button 36 is pushed the shuttle pin 52 is moved to the left, and conversely if half button 38 is pushed the shuttle pin 52 is moved to the right.

Considered more specifically, the shuttle pin 52 has a middle portion 60 which is reduced in diameter. The arm 54 is bifurcated and straddles the necked portion 60 of the shuttle pin, the latter being disposed horizontally while the pivot 62 of the shuttle lever is disposed vertically and extends between and is carried by the top and bottom walls 64 and 66 (FIG. 3) of the button shell 26, the latter being rectangular in cross-section. The arm 56 of the shuttle lever is high enough to be engaged by the upper half button 36, and the arm 58 of the shuttle lever is low enough to be engaged by the lower half button 38. In preferred form the inner ends of the half buttons are stepped or cut away and carry pins 68 (FIG. 3), and the ends of the arms 56 and 58 are bifurcated to straddle the pins 68, as shown in FIGS. 3 and 4. This holds the half buttons from coming out of the button shell.

In FIG. 3 it will be seen that inward motion of the half buttons is limited by flanges 70. Outward or return movement of a button assembly is provided by appropriate resilient means, in the present case a compression spring 72 surrounding a rearward projection or tip 74 of the key 42, the key being connected to the button assembly by means of the shuttle pin 52. Each key similarly is provided with a tip and a compression spring. Reverting to FIG. 4, the sides of the button shell 26 have inwardly stepped walls as shown at 76, to carry the shuttle pin 52, while clearing the forward ends of the keys 42 and 44, or more specifically their key extensions 94 and 94'. The button assemblies are slidably supported in a stationary guide 78, the latter being mounted on and projecting forwardly from the metal front plate 80 of the frame or housing of the pushbutton tuner. It is attached by screws 77 holding flanges 79. The guide 78 is molded in upper and lower halves, to fit around the flanges 27 (FIG. 3) of the button shell 26. Outward motion is limited by stop flange 81 on shell 78.

The main rocker 40 here shown comprises spaced parallel rods 82 and 84, carried on trunnions 86 (FIGS. 2 and 5) and 88 (FIGS. 3 and 4) located halfway between the rods. The angularly adjustable means 46 carried by key 42 is called a cam, and has oppositely extending wings 90 and 92 (FIG. 3) for bearing against the rods 82 and 84 and thereby angularly positioning the rocker. The cam is essentially is semicircle but cut away to allow for the thickness of the rods 82 and 84.

For adjustment of the cam 46 I provide a lock mechanism essentially like that disclosed in my Pat. 2,996,925 previously referred to. Referring to FIG. 4, key 42 has a key extension 94 which is movable longitudinally of the key. The key extension has a projection at 96 which engages the detent portion 98 of a lock 100 the rear end 102 of which bears tightly against the cam 46 to lock it in desired angular position. To unlock the cam the button assembly is pulled outward, thereby moving the key extension 94 outward, and so disengaging the projection 96 from the detent portion 98. The resulting inward movement of lock 100 about its fulcrum 104 releases the cam 46 so that it is free to turn about its pivot 106. After the receiver has been tuned to a desired station an inward push of the button assembly first turns the cam to proper angular position and then moves the key extension 94 rearward until the lock 100 again locks the cam in its newly adjusted angular position. During the said outward and inward movements of the button assembly it is assumed that the desired half button is in depressed or operative position. Thus in FIG. 4 it is the AM receiver that would be tuned, rather than the FM receiver.

It will be recalled in FIG. 1 that knob 14 provides manual tuning, and for this purpose it is mounted on a shaft 110, and referring next to FIG. 4, the rear end of shaft 110 carries a pinion 112 meshing with a crown gear 114 which turns a shaft 116, the left end of which carries a pinion 118 which meshes with a gear 120, which acts as one end of the rocker. Gear 120 requires only a segment of teeth as shown in FIG. 3, and carries the ends of rods 82 and 84. To eliminate backlash a companion gear 122 may be provided immediately adjacent the gear 120, and offset parts of the gears are subjected to compression springs indicated at 124 in FIG. 3. This spreads the teeth of the two gears to fill the tooth spaces of the pinion 118, thus avoiding backlash.

The pinions are relatively small in diameter, and the gears are relatively large in diameter, thus constituting a reduction gear train. It is therefore desirable to release the manual tuning knob when tuning by means of a pushbutton, and for this purpose a clutch is provided in the reduction gear train substantially as described in my aforesaid Pat. 2,996,925. Specifically the crown gear 114 bears axially against a friction disk 124, which bears against a clutch disk 126 secured to the shaft 116. Shaft 116 is rotatable inside a fixed sleeve 128. A bushing 130 is rotatably and axially movable on the outside of fixed sleeve 128, and carries the crown gear 114. It is normally moved to the right to engage the friction clutch 124 by means of a declutch plate 132. The latter has a yoke 133 received in a groove 131 of bushing 130. Declutch plate 132 is normally in the solid line position shown, it being urged to the right by means of a long pull spring, one end of which is shown at 134 in FIG. 5, the said end being connected to an ear 136 on the declutch plate. FIG. 5 is a bottom view, and the spring therefore pulls ear 136 to the left, it being understood that the left or remote end of spring 134 is fixedly connected to the frame.

Reverting to FIG. 4, the declutch plate 132 is cut away to provide a series of cam surfaces 138, there being one such cam surface for each key. Each cam surface is disposed directly in the path of the rear end or tip of a key, and it will be evident that when any key is pushed it initially moves the declutch plate 132 to the left or broken line position, thereby pulling the bushing 130 and crown gear 114 away from the friction disk 124, and thereby disconnecting the manual tuning knob and most of the reduction gear train. This movement of the crown gear 114 is accommodated by movement of shaft 110 and pinion 112 to the left, the bearing in shaft support 140 being a slot which accommodates the movement. To insure mesh of the teeth of pinion 112 with those of crown gear 114 the bushing 130 preferably carries a thin disk 140 made of resilient material and bearing against the inner end of shaft 110 as shown. This also eliminates backlash at the crown gear teeth.

For tuning either AM or FM, the tuner further includes a changeover electrical switch, indicated at 150 in FIGS. 1, 2 and 5. In the present case this is a double pole, double throw switch having six terminals which project upwardly, the switch being inverted so that its control button 152 projects downward. The switch shown is of the slide type, and I provide a switch operating plate 154 which extends horizontally transversely beneath the row of keys as shown in FIGS. 3, 4 and 5. One end of the plate projects from the frame as shown at 156 (FIG. 5) and is notched to fit around the switch button 152.

The switch plate 154 has cam surfaces 158 and 160 which are disposed in the path of the keys. FIG. 3 shows how key 44 has a depending lug 162 which is in the path of cam 160, and each key similarly has a lug like the lug 162.

Reverting to FIG. 5, it should be noted that the cams 158 and 160 for a pair of keys face in opposite direction, so that the switch is appropriately moved for AM operation or for FM operation, depending on whether the upper or lower half button is pushed. In this respect the cams of the switch plate 154 are very different from the cams of the declutch plate 132 shown in FIG. 4, because in the latter case all of the cams face in one direction in order to release the clutch regardless of which half button is pushed, whereas with the switch plate shown in FIG. 5 there is no movement when adhering to the same type reception (one AM station to another AM station, for example) but there is movement when changing from one type reception to the other (from AM to FM reception, or vice versa).

It will be understood by those skilled in this art that the rocker 40 is suitably connected to tuning means. For example it may be connected to the shaft of a ganged variable capacitor for simultaneously tuning of multiple circuits. In modern practice it is more common to use permeability tuned coils, and the rocker positions the tuning cores or slugs of the coils. These have been omitted in order to simplify the drawings, but it may be explained with reference to FIG. 3 that the rocker at each end has a pin 170 received in the side arm 172 of a horizontally slidable carriage the cross bar of which is indicated at 174. FIG. 2 shows horizontal guide slots 176 in the end plate 178 of the frame, the slots receiving ears which project from the slidable carriage into the slots for guidance. Reverting to FIG. 3 the frame includes a row of cylinders 180 which receive tuning coils in alignment with the slidable carriage.

Referring now to FIG. 6, tuning coil 182 is tuned by movement of its core 184, the latter being moved by means of a threaded link or rod 186 extending to the cross bar 174 of the slidable carriage. The initial position of the core may be adjusted by introducing the threaded extension of the core into a threaded, insulated grommet located generally at 188 or into a pliable insulated grommet which permits self-threading, the grommet being retained by the carriage, and thereafter the variable tuning position of the core is determined by the angular position of the rocker 40, which determines the horizontal position of the slidable carriage.

It will be understood that in a typical case there would be six coils with cores connected to the carriage of which three cores serve to tune the three circuits of the AM section of the receiver and the remaining three cores serving to tune the three circuits of the FM section of the receiver. However, it will be understood that if desired one section of the receiver could be capacitively tuned, and the other section inductively tuned, and yet both be varied by the same rocker.

It is believed that the construction and operation of my improved pushbutton tuner, as well as the advantages thereof, will be apparent from the foregoing detailed description. It will also be apparent that while I have shown and described the invention in a preferred form, changes may be made without departing from the scope of the invention as sought to be defined in the following claims.

I claim:

1. A pushbutton tuner comprising a rocker, a plurality of button assemblies each including shuttle mechanism, two collateral keys for each button assembly, each key having independently adjustable means for bearing against and positioning the rocker for tuning, and means whereby when the shuttle mechanism is in one position the button assembly moves one key for one tuning position of the rocker, whereas when the shuttle mechanism is in another position the button assembly moves the other key for another tuning position of the rocker, said shuttle mechanism including two half buttons, and said button assembly comprising a button shell carrying the two half buttons, the shuttle mechanism being such that when one half button is pressed the button assembly moves one key as aforesaid, and when the other half button is pressed the button assembly moves the other key as aforesaid.

2. A pushbutton tuner as defined in claim 1, in which the mechanism carried by the button assembly comprises a shuttle pin disposed transversely of the assembly and movable axially between two end positions in one of which it is disposed in the path of one key and in the other of which it is disposed in the path of the other key, and a shuttle lever having arms engaged by the half buttons and so connected to the shuttle pin that when one half button is pressed it causes the shuttle lever to shift the shuttle pin in one direction and when the other half button is pressed it causes the shuttle lever to shift the shuttle pin in the opposite direction.

3. A pushbutton tuner as defined in claim 2, in which the rocker has spaced parallel rods and is pivoted on an axis between the rods, and in which the independently adjustable means carried by each key comprises an angularly adjustable cam with wings for bearing against and angularly positioning the spaced rods of the rocker.

4. A pushbutton tuner as defined in claim 2, in which the shuttle pin has a middle portion which is reduced in diameter, and in which the shuttle lever has three angularly related arms, one of said arms being in the path of one half button, another of said arms being in the path of the other half button, and the third arm straddling the reduced diameter middle portion of the shuttle pin.

5. A pushbutton tuner as defined in claim 2, in which the half buttons are disposed one over the other, the keys being disposed side by side, the shuttle pin being disposed horizontally, the pivot of the shuttle lever being disposed vertically and being carried between the top and bottom walls of the button shell, one arm of said shuttle lever being high enough to be engaged by the upper half button, and another arm of said shuttle lever being low enough to be engaged by the lower half button.

6. A pushbutton tuner as defined in claim 2, in which the shuttle pin has a middle portion which is reduced in diameter, and in which the shuttle lever has three angularly related arms, one of said arms being in the path of one half button, another of said arms being in the path of the other half button, and the third arm straddling the reduced diameter middle portion of the shuttle pin, the half buttons being disposed one over the other, the keys being disposed side by side, the shuttle pin being disposed horizontally, the pivot of the shuttle lever being disposed vertically and being carried between the top and bottom walls of the button shell, one arm of said shuttle lever being high enough to be engaged by the upper half button, and another arm of said shuttle lever being low enough to be engaged by the lower half button.

7. A pushbutton tuner as defined in claim 2, in which the rocker extends horizontally, and in which there is a horizontal row of rectangular pushbutton shells, and in which the two half buttons of each shell are disposed one over the other, and in which the collateral keys are disposed side by side in a horizontal row, and in which the shuttle pins are carried by the button shells and are horizontal, and in which each shuttle lever is disposed on a vertical pin extending between and carried by the top and bottom walls of a button shell, and in which each shuttle lever has three angularly related arms one of which is high enough to be in the path of the upper half button, another of which is low enough to be in the path of the lower half button, and a third of which extends to the shuttle pin for shifting the same axially.

8. A pushbutton tuner as defined in claim 2, in which there is a manual tuning means including a knob with a reduction gear train leading to the rocker, a clutch in said reduction gear train to release the manual tuning knob when tuning by means of a pushbutton, and a declutch plate having camming surfaces in the path of the keys and connected to the clutch, whereby operation of a pushbutton causes operation of the declutch plate to release the clutch.

9. A pushbutton tuner as defined in claim 2, in which one shuttle position is used for AM tuning and the other shuttle position is used for FM tuning, and in which the tuner includes a change-over electrical switch for change-over from AM to FM or vice versa, and further includes a switch plate having camming surfaces engaged by said keys for operating the change-over switch in appropriate direction for AM operation or FM operation depending on which shuttle position is used, and in which there is a manual tuning means including a knob with a reduction gear train leading to the rocker, a clutch in said reduction gear train to release the manual tuning knob when tuning by means of a pushbutton, a declutch plate having camming surfaces in the path of the keys and connected to the clutch whereby operation of a pushbutton causes operation of the declutch plate to release the clutch, all of the cam surfaces facing one way on the declutch plate, and alternate cam surfaces facing in opposite directions on the switch plate.

10. A pushbutton tuner as defined in claim 1, in which one set of half buttons is used for AM tuning, and in which the other set of half buttons is used for FM tuning, and in which the tuner includes a change-over electrical switch for change-over from AM to FM or vice versa, and further includes a switch plate having camming surfaces engaged by said keys for operating the change-over switch in appropriate direction for AM operation or FM operation depending on which half button is pushed.

References Cited

UNITED STATES PATENTS

| | | | |
|---|---|---|---|
| 2,793,531 | 5/1957 | Thompson | 74—10.33 |
| 3,357,264 | 12/1967 | Newman | 74—10.27 |
| 3,206,988 | 9/1965 | Hopt et al. | 74—10.27 |
| 3,247,728 | 4/1966 | Wolf et al. | 74—10.33 |

MILTON KAUFMAN, Primary Examiner

U.S. Cl. X.R.

334—7

UNITED STATES PATENT OFFICE

CERTIFICATE OF CORRECTION

Patent No. 3,554,041 Dated January 12, 197[illegible]

Inventor(s) Russell D. Stamm

It is certified that error appears in the above-identified patent and that said Letters Patent are hereby corrected as shown below:

In the heading to the printed specification, line 5, "New Jersey" should read -- Delaware --.

Signed and sealed this 25th day of May 1971.

(SEAL)
Attest:

EDWARD M.FLETCHER,JR.
Attesting Officer

WILLIAM E. SCHUYLER, JR.
Commissioner of Patents